March 4, 1941.  C. ABSMEIER  2,233,570

APPARATUS FOR MOLDING SHEETS

Filed Aug. 11, 1938  2 Sheets-Sheet 1

INVENTOR
CARL ABSMEIER
BY
ATTORNEY

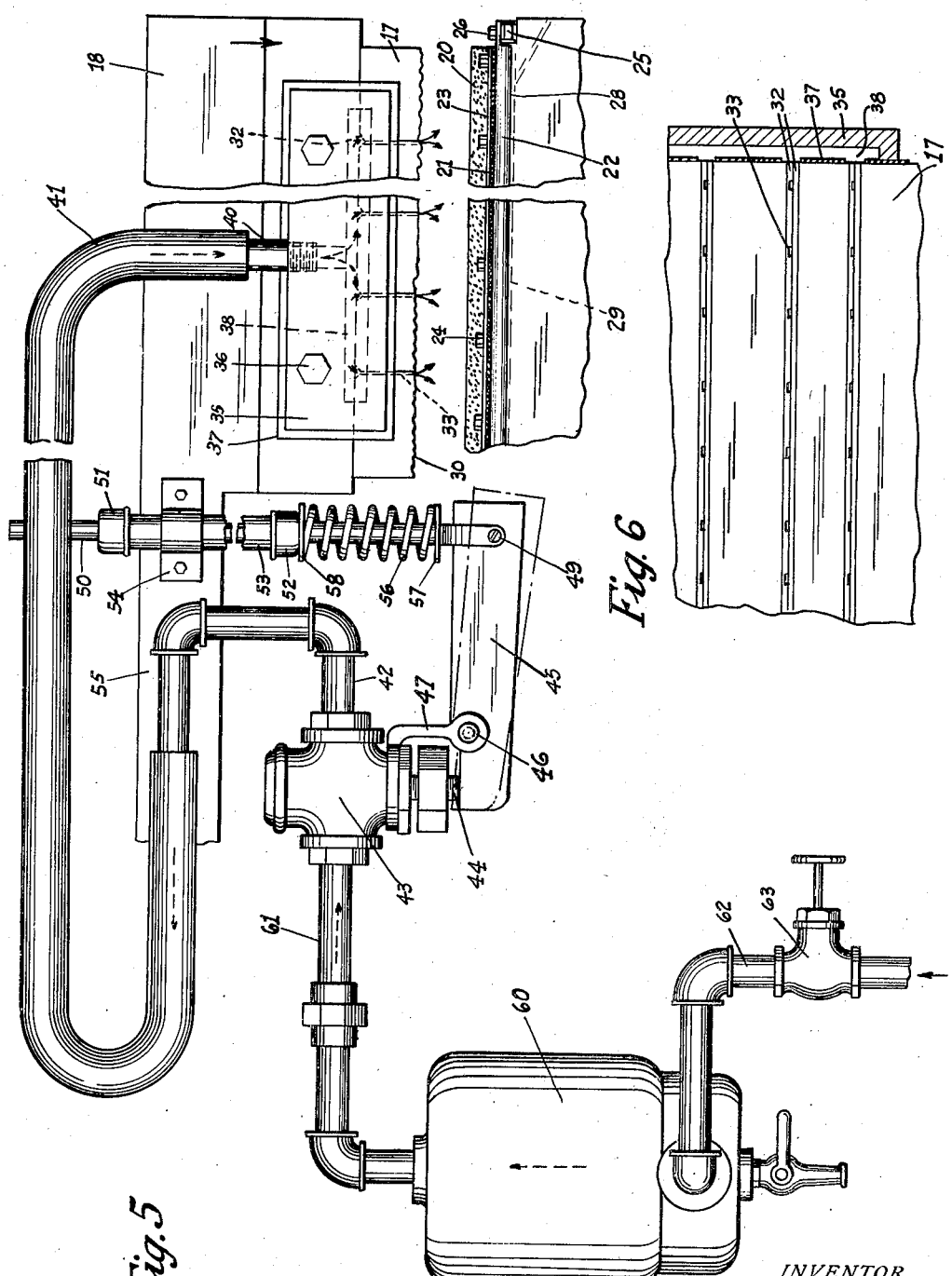

Patented Mar. 4, 1941

2,233,570

UNITED STATES PATENT OFFICE 2,233,570

APPARATUS FOR MOLDING SHEETS

Carl Absmeier, La Grange, Ill., assignor to United States Gypsum Company, Chicago, Ill., a corporation of Illinois Application August 11, 1938, Serial No. 224,257

3 Claims. (Cl. 18—17)

This invention relates to molded sheets such as those used in the manufacture of asbestos-cement shingles. The invention further relates to apparatus for pressing said sheets.

In the manufacture of asbestos-cement shingles, it is customary to form a continuous strip of asbestos-cement material on cylinders and felt. The material is wound around the accumulator roll to the desired thickness, after which it is cut and laid on a continuous screen belt which carries it between the platens of a powerful hydraulic press. The upper platen of the press may carry an embossed lower face, such as wood grain, which forms a like impression on the upper surface of the sheet as the platens press together. After the pressure is applied and then released, the upper platen rises away from the pressed sheet. I have found that lubricant on the textured die is not entirely effective in causing the sheet to free from the die as the upper platen rises. Due to the die pressure, a perfect vacuum is formed between the textured die surface and the sheet which causes the center of the sheet to rise with the platen to a certain height with the edges of the sheet bowing downwardly. When the sheet finally releases at the center, it falls onto the screen belt over the lower platen and the edges of the sheet crumple or wrinkle causing a large percentage of the sheet to become unsaleable waste.

An object of the invention, therefore, is to produce a molded asbestos-cement sheet having an embossed surface free from wrinkles.

Another object of the invention is to apply compressed air to the upper die or platen in such a way as to prevent the formation of a vacuum between the textured surface of the die and the sheet; also to improve pressed sheets and their process of manufacture in other respects hereinafter specified and claimed.

Reference is to be had to the accompanying drawings forming a part of this specification, in which Fig. 1 is an end elevation of the hydraulic press with my improved compressed air attachment.

Fig. 5 is an enlarged elevation of the compressed air attachment, and Fig. 6 is a fragmentary plan view of the die.

Figure 1:
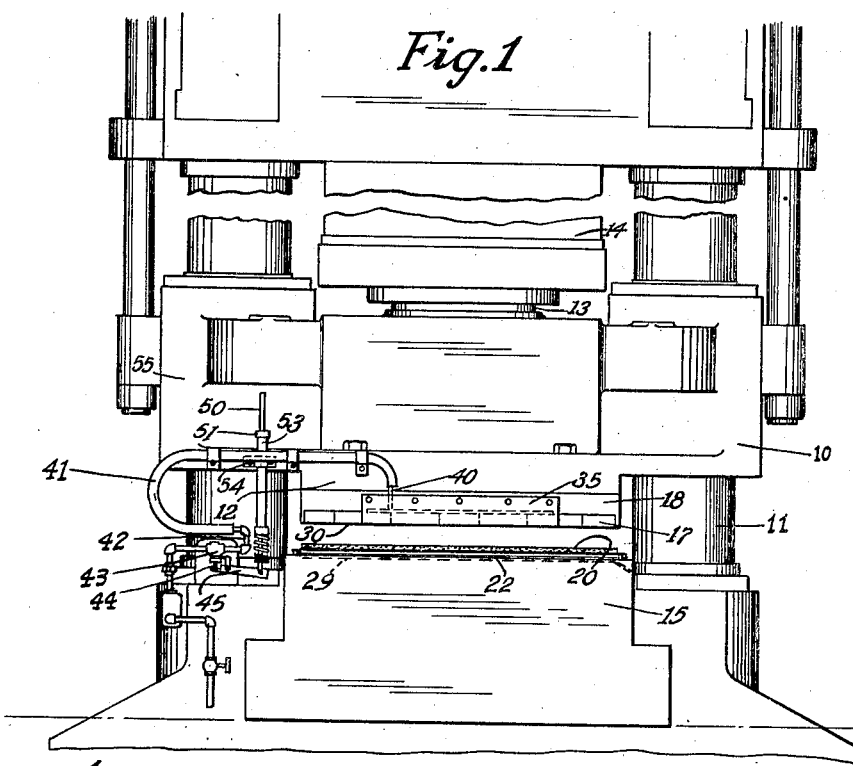
Figure 2:
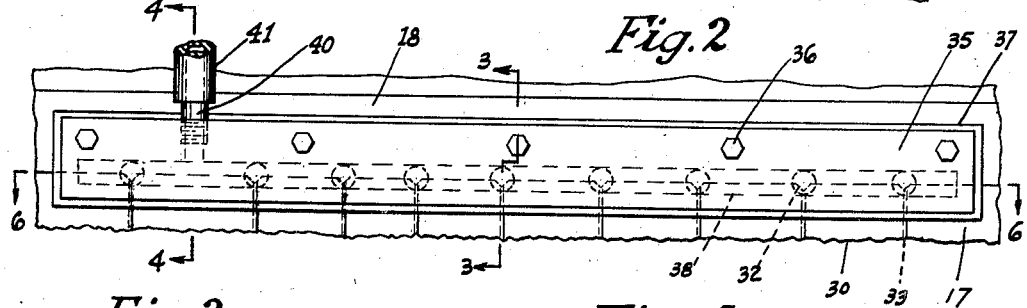
Fig. 2 is an elevation on a large scale of the compressed air manifold.
Figure 3:
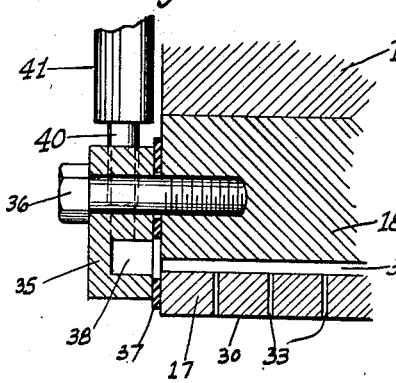
Fig. 3 is a sectional elevation through the manifold taken on line 3—3 of Fig. 2.
Figure 4:
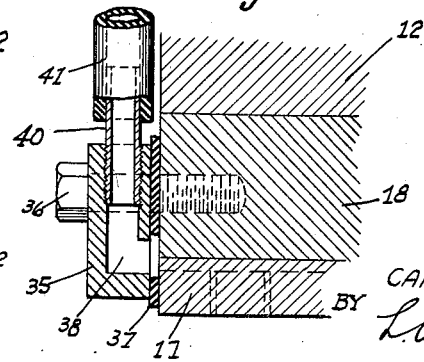
Fig. 4 is a sectional elevation through the manifold taken on line 4—4 of Fig. 2.

Referring to the drawings by numerals, a hydraulic press 10 is provided with connecting rods 11, an upper platen 12, pistons 13, cylinders 14, and a base 15. Die blocks or strips 17 are secured to the upper platen 18 in edge abutting relation. The sheets 20 of asbestos-cement composition are carried on screens 21, the forward end of each screen being secured to a transverse rod 22 by means of a clamping strip 23 and bolts 24. The ends of rods 22 are secured to conveyor chains 25 by bolts 26. The chains 25 move along the platen frame 15 with an intermittent manually controlled movement caused by suitable drive mechanism not shown. A perforated plate 28 supports the screen 21 on the base 15 for the passage of drainage water when the sheet is pressed, and transverse drain grooves 29 are formed in the upper face of the base 15 to drain this water to the side of the press. The lower faces of die strips 17 are provided with embossed ridges 30 to press a textured surface on the upper face of sheet 20, such as wood graining.

The salient feature of my invention consists in a mechanism or attachment for injecting compressed air at the embossed die surface 30 just before said surface contacts with the sheet 20 and also during the pressing operation so as to prevent the formation of a vacuum as the die 17 lifts away from the pressed sheet 20. The die strips 17 are provided with beveled upper corners 32 extending from one end of the die strips 17 to a point near the opposite end thereof, so as to form compressed air channels. Shallow grooves 33 are filed or otherwise formed in the abutting edges of the die strips 17 to lead compressed air from the channels 32 to the embossed pressing face 30 of said die strips 17. A manifold 35 is secured by bolts 36 to the ends of die strips 17, a gasket 37 being provided to insure an air-tight joint for the manifold. A longitudinal air passage 38 in manifold 35 registers with and connects the grooves 32. A pipe 40 is connected to the passage 38 and is connected by an air hose 41 and pipe 42 to an air valve 43 having a valve rod 44 for opening and closing said valve. A lever 45 is pivotally mounted on fixed pivot pin 46 supported on bracket 47 so that one end of said lever 45 is positioned to actuate the rod 44. The opposite end of lever 45 is pivotally connected by pin 49 to a vertical push rod 50 which slides through caps 51 and 52 on a pipe 53 which is rigidly supported by a bracket 54 on the vertically reciprocating upper platen frame 55. A spring 56 and washers 57 and 58 are mounted on the rod 50, so that when the cap 52 presses against the washer 58 and spring 56 by the lowering of the platen frame 55, the air valve 43 is opened to admit compressed air to the surface of the die strips 17 just before the die contacts with the sheet 20. Thus at the instant of pressing, the texture grooves on die strips 17 are automatically filled with compressed air, and some of the air is entrapped between the sheet and the die. Some of the air finds its way into the body of the porous sheet 20 while pressing takes place so that a film of air exists between the sheet and the die while pressing. When pressing is completed and the die starts upward, the sheet 20 lies flat on the screen 21 due to the presence of the compressed air at the surface of the die which has prevented the formation of a vacuum between the sheet and the die. After a short upward movement of the platen frame 55, the compression on spring 56 is released and the valve 43 is closed. An air filter 60 is connected by a pipe 61 to the valve 61 and a supply pipe 62 having valve 63 leads from a supply source for compressed air. The purpose of air filter 60 is to prevent particles of dirt in the compressed air from stopping up the grooves 33.

As a result of my invention, sheets of asbestos-cement textured shingle material have been successfully manufactured in great quantities, these sheets having dimensions of 4' 7" x 12' 6" or about 57 sq. ft. each. These sheets have a finished thickness of about $\frac{3}{16}$", so that in the wet, pressed state, they are very fragile. Twenty-five pounds per square inch air pressure has been found satisfactory. Previous to my invention, the sheets would bow upwardly in the center when the upper platen raises, and then drop to cause wrinkled sheets having a high percentage of waste. Through the use of my invention, the sheets lie perfectly flat as the upper platen rises to produce unwrinkled sheets having little or no waste.

I would state in conclusion that, while the example illustrated constitutes a practical embodiment of my invention, I do not wish to limit myself precisely to the specific details, since manifectly the same may be considerably varied without departing from the spirit of the invention as defined in the appended claims.

Having thus described my invention, I claim as new and desire to secure by Letters Patent:

1. The steps in the method of pressing sheet material with a pressing platen, which comprises injecting compressed air adjacent said sheet immediately in advance of contacting said surface with a pressing platen, and maintaining air pressure on said sheet while said platen is in contact with said sheet and during a portion of the travel of said platen away from said sheet.

2. In an apparatus for pressing sheets of material, a fixed platen, a movable platen, die means on said movable platen, means for pressing said die means against said sheet, said die means having air passages therethrough to the pressing surface of said die means, a compressed air manifold associated with said die means and connected to said passages, means for supplying compressed air to said manifold and passages, and means controlled by the movement of said movable platen for injecting compressed air into said manifold.

3. In an apparatus for pressing sheets of material, a fixed platen, a movable platen, die means on said movable platen, means for pressing said die means against said sheet, said die means having passages therethrough to the pressing surface of said die means, a compressed air manifold associated with said die means and connected to said passages, a compressed air inlet valve connected to said manifold and passages, a lever arranged to open said valve, a rod pivotally secured to said lever and mounted on said movable platen, a spring mounted on said rod, and means for pressing on said spring and actuating said lever when said platen moves.

CARL ABSMEIER.